United States Patent [19]
Le Corviger et al.

[11] 3,807,660
[45] Apr. 30, 1974

[54] MISSILE FLIGHT CONTROL SYSTEM

[75] Inventors: Philippe Le Corviger, Paris; Michel Montastier, Chatenay-Malabry, both of France

[73] Assignee: Scoiete Nationale Industrielle Aerospatiale, Paris, France

[22] Filed: Nov. 6, 1972

[21] Appl. No.: 303,840

[30] Foreign Application Priority Data
Nov. 8, 1971   France .............. 71.40002
Jan. 7, 1972   France .............. 72.00533

[52] U.S. Cl. .............................................. 244/3.22
[51] Int. Cl. ................................................ F41g 7/00
[58] Field of Search ...... 244/1 SA, 1 SS, 3.21, 3.22; 235/150.25

[56] References Cited
UNITED STATES PATENTS

| | | | |
|---|---|---|---|
| 3,586,261 | 6/1971 | Paine | 244/1 SA |
| 3,547,381 | 12/1970 | Shaw | 244/1 SA X |
| 3,231,726 | 1/1966 | Williamson | 235/150.25 X |
| 3,282,541 | 11/1966 | Webb | 244/3.22 |
| 3,493,194 | 2/1970 | Kurzhals | 244/1 SA |
| 3,612,442 | 10/1971 | Chisel | 244/3.22 |
| 3,614,027 | 10/1971 | Lewis | 244/3.22 |

*Primary Examiner*—Verlin R. Pendegrass
*Attorney, Agent, or Firm*—Karl W. Flocks

[57]   ABSTRACT

Logic system for controlling a missile in flight comprising four deflecting surfaces actuated between two positions, by the means of three binary signals, the eight arrangements of said binary signals, on an electric or electronic circuit, including OR and AND gates and NOR gates, determining the order in yaw or pitch in association with possible roll control for fetching a reference plane.

17 Claims, 24 Drawing Figures

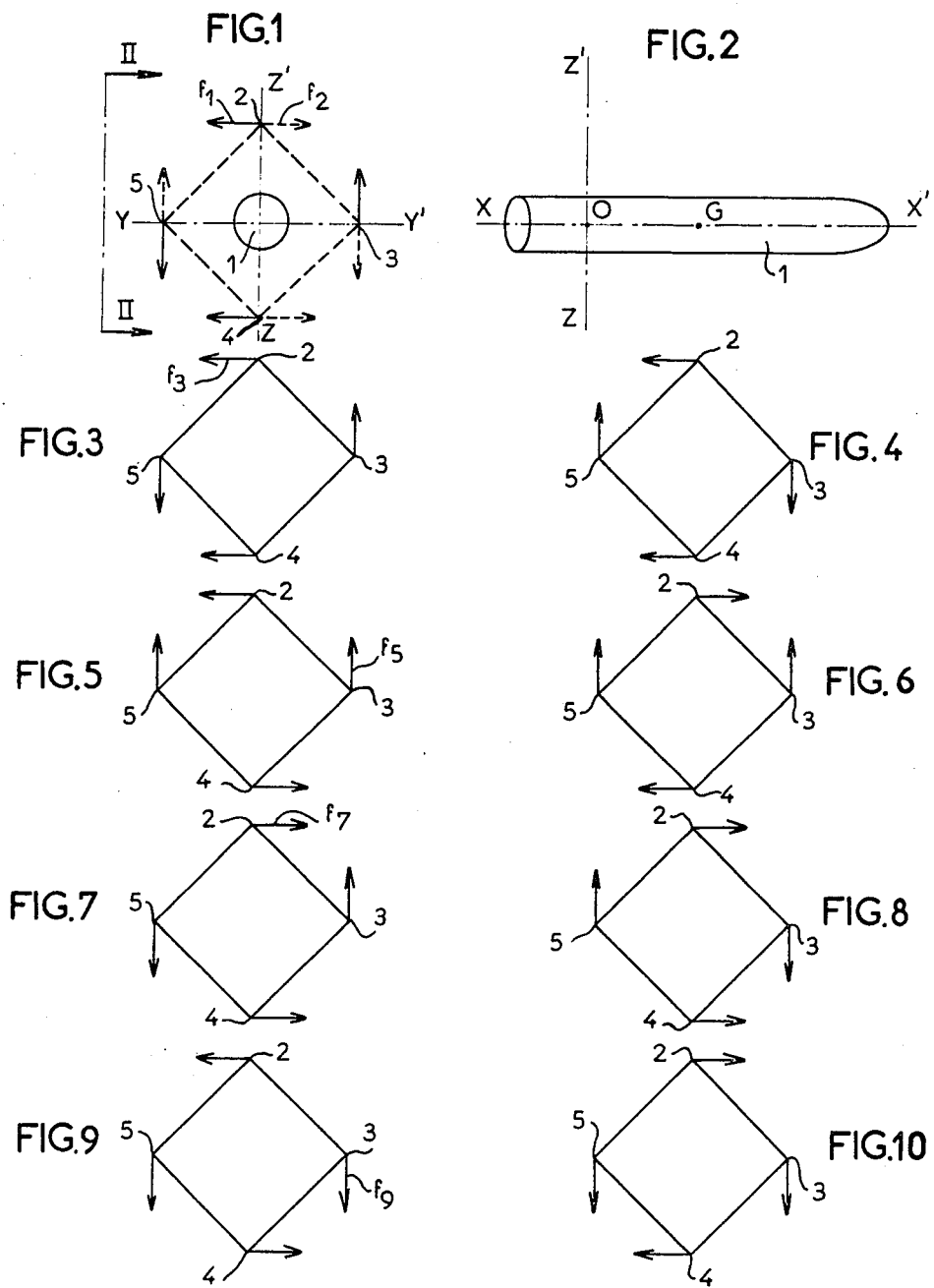

MISSILE FLIGHT CONTROL SYSTEM

The present invention relates to a logic system for controlling a missile in flight by means of devices actuated between two positions by a binary signal, such as a plurality of ejection nozzles disposed about the axis of the missile on a plane normal thereto and not passing through the centre of gravity of the missile.

Such devices could be four aerodynamic control surfaces on a cruciform missile, positioned either ahead of or behind the centre of gravity.

Already known are missile control surfaces consisting of continuously fed ejection nozzles, a deflector controlled by a binary signal being provided to move as required between two positions in order to direct the jet in a plane normal to the missile axis either in one direction or in the opposite direction, thereby making it possible to impart a yawing or pitching motion with respect to a missile reference plane, possibly combined with a rolling motion.

Likewise known are control surfaces of the aerodynamic kind which have the same properties when the missile is moving through a fluid.

The present invention provides for a peripheral arrangement of four such control surfaces the deflections of which are controlled by means of three binary signals the eight possible arrangements of which on an electric or electronic circuit allow determining any one of the eight arrangements for controlling the flight of the missile in yaw and in pitch, in association with possible roll control means for fetching a reference plane of the missile into coincidence with a reference plane in space.

An electric, electronic, hydraulic or pneumatic logic circuit receives a flight control command input consisting of these three binary signals and delivers a signal composed of four binary signals each of which actuates one of the four control surfaces. The eight possible triplets are used for the input signal, each consisting of three binary signals, but only eight out of the 16 possible quadruplets are used for the output signal, each composed of four binary signals corresponding to a specific input configuration.

Also known are missile flight control systems utilizing four control surfaces similarly disposed on the missile, but the actuating signal for each control surface is in this case generated by means of a linear combination of the three roll and pitch-yaw signals in continuous form. The preferred embodiment of this invention, described hereinafter, provides directly generated GO/NO/ GO actuating signals for each control surface on the basis of the three roll and pitch-yaw signals, which are themselves in binary form, and allows combining them by means of cheaper and simpler components.

More specifically, the electronic circuits may include OR and AND gates and NOR gates.

In one form of embodiment of the invention, the purpose of the roll command is to restore a missile reference plane into parallelism with a possibly vertical reference plane in space. This has the advantage of enabling direct use to be made of the pitch-yaw signals generated with respect to fixed spatial references for vertical and directional guidance of the missile. In alternative forms of embodiment, the desired inclination in roll may be variable in the same way as in pitch and in yaw.

Further particularities and advantages will emerge from the description which follows of two non-limitative exemplary embodiments of the invention, given with reference to the accompanying drawings, in which:

FIG. 1 is a schematic front view of the arrangement of the control surfaces on a missile in accordance with a first embodiment of the invention;

FIG. 2 is a side elevation view along 11—11 in FIG. 1;

FIGS. 3 to 10 are diagrammatic illustrations of the operation of a set of control surfaces in accordance with a first embodiment of the invention;

In accordance with a first possible embodiment of the invention, shown in FIG. 1, a missile 1 is provided with four jet control surfaces 2 to 5, each of which is capable independently and as required of imparting a rotational motion in either direction about the missile axis XX'.

The control surfaces lie in a plane (YY') (ZZ') passing through a point O chosen for example to the rear of the missile's centre of gravity G. A two-position jet spoiler intercepting each flight control jet deflects the force of the jet in the direction of either the solid-line arrow $f1$ or the dash-arrow $f2$, depending on its position.

The position of each spoiler is controlled by a binary signal, for example by the signal 1 for the position corresponding to arrow $f1$ and by the signal 0 for the position corresponding to arrow $f2$.

It will be noted that the control surfaces 2 to 5 are preferably positioned at the four corners of a square integral with the missile, the directional jets being preferably oriented at right angles to the corresponding principal plane of the missile passing through the spoiler.

In one specific embodiment, use is made of only eight combinations of the directional jets by pairing a first and third control surfaces in order to allow of tilting the missile axis in one direction or the other in one of two mutually perpendicular principal planes of the missile, the second and fourth control surfaces being commanded into the four different flight control positions whereby to exert a rotational moment in one direction or the other about the missile axis in order to restore said principal missile planes into their correct predetermined reference positions in relation to a reference plane in space.

Reference to FIGS. 3, 5, 7 and 9 shows that the parallel forces $f3$, $f5$, $f7$, $f9$ acting in the same direction produce a resultant force which causes the missile to veer to the left, dive to the right, and assume a nose-up attitude, respectively, if the plane (XX') (ZZ') is vertical, the other two forces produced by the two pairs of control surfaces generating (in the case of FIGS. 3, 5, 7 and 9) a moment in a first direction of spin about the missile symmetry axis XX' and, in the case of the corresponding FIGS. 4, 6, 8 and 10, a spinning moment in a second opposite direction.

Thus eight quadruplet combinations of the four binary output signals $a$, $b$, $c$, $d$, actuating the control surfaces can correspond to eight triplet combination of three binary input command signals $\alpha$, $\beta$, $\gamma$ as shown in Table I below:

TABLE I

| Input command signals: | | | Output signals: | | | |
|---|---|---|---|---|---|---|
| $\alpha$ | $\beta$ | $\gamma$ | $a$ | $b$ | $c$ | $d$ |
| 0 | 0 | 0 | 0 | 0 | 0 | 1 |
| 0 | 0 | 1 | 0 | 0 | 1 | 0 |
| 0 | 1 | 0 | 0 | 1 | 0 | 0 |
| 0 | 1 | 1 | 1 | 0 | 0 | 0 |
| 1 | 0 | 0 | 1 | 1 | 1 | 0 |
| 1 | 0 | 1 | 1 | 1 | 0 | 1 |
| 1 | 1 | 0 | 1 | 0 | 1 | 1 |
| 1 | 1 | 1 | 0 | 1 | 1 | 1 |

Figure 11:
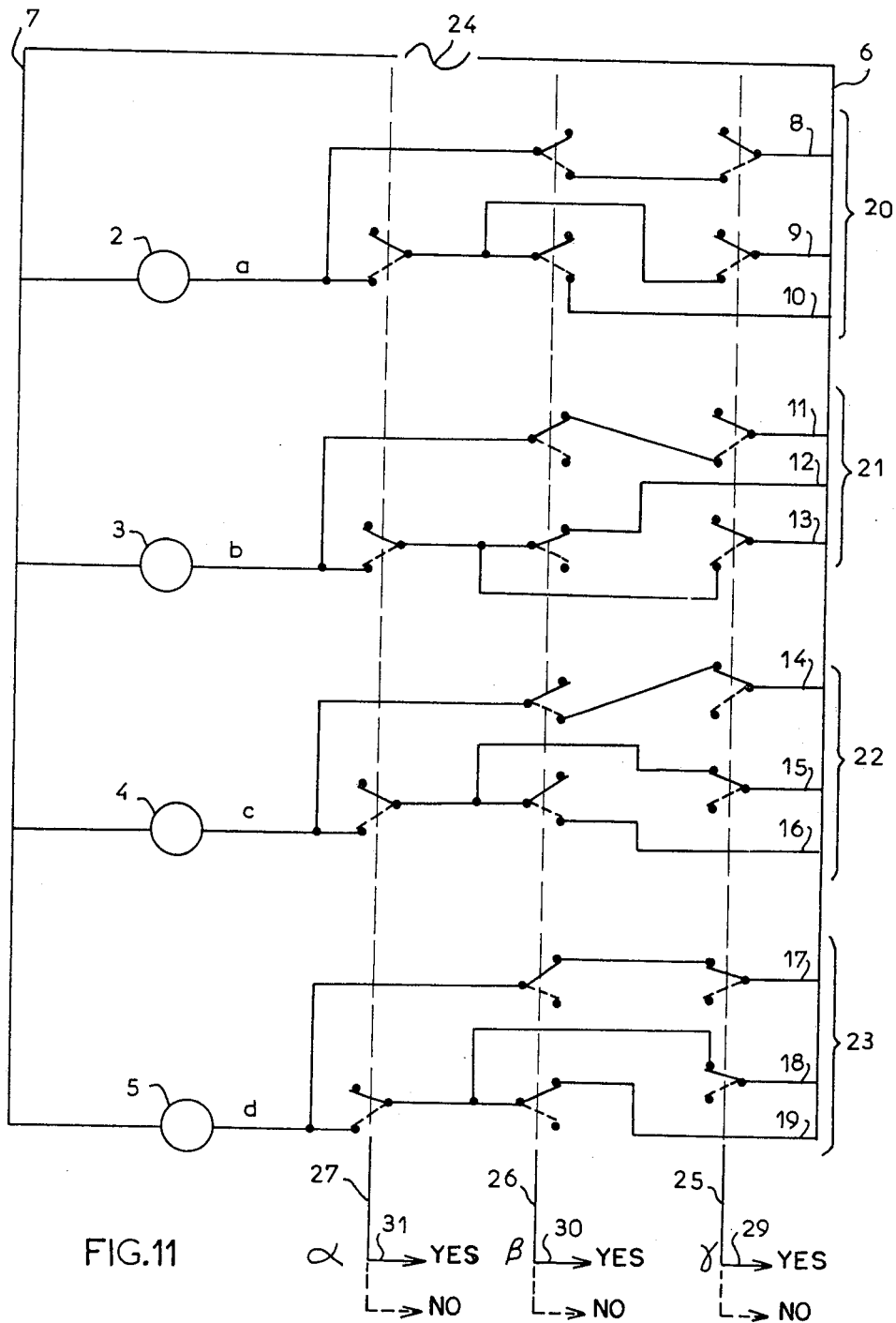
FIG. 11 is an electric circuit diagram for controlling the arrangement in FIG. 1.

A first possible embodiment of the invention is shown on the electrical circuit of FIG. 11, which corresponds to the state of the control surfaces indicated in FIG. 10.

A current source 24 across lines 6 and 7 energizes the flip-flops of the GO or NO GO type control surfaces 2, 3, 4, 5 through the medium of 12 circuits 8 through 19 arranged in four groups 20 to 23.

FIG. 11 shows three lines 25, 26 and 27 of twinned switches positioned on circuits 8 through 19 in a manner to be described in detail hereinafter.

Depending on whether the pointers 29, 30 and 31 face the indication YES or the indication NO, a signal in the form ( $\alpha$, $\beta$, $\gamma$) is applied to the four groups 20 to 23 of the electric circuits in FIG. 11.

With the three pointers opposite the YES indication, shown in FIG. 11, the states obtained are as shown in Table II below and correspond to excitations $\alpha'$, $\beta'$, $\gamma'$ on each group 20 to 23 for FIG. 10.

TABLE II

| Group | Command signals | | | Output line | Control surface | Output signal |
|---|---|---|---|---|---|---|
| | $\alpha'$ | $\beta'$ | $\gamma'$ | | | |
| 20 | 0 | 0 | 0 | $a$ | 2 | 0 |
| 21 | 0 | 1 | 0 | $b$ | 3 | 0 |
| 22 | 0 | 0 | 1 | $c$ | 4 | 0 |
| 23 | 0 | 1 | 1 | $d$ | 5 | 1 |

When on the contrary the pointers 29, 30, 31 shown in dash lines, are opposite the NO indication, all the switches are reversed and the opposite arrangement tabulated in Table III below would be obtained.

TABLE III

| Group | Command signals | | | Output line | Control surface | Output signal |
|---|---|---|---|---|---|---|
| | $\alpha'$ | $\beta'$ | $\gamma'$ | | | |
| 20 | 1 | 1 | 1 | $a$ | 2 | 1 |
| 21 | 1 | 0 | 1 | $b$ | 3 | 1 |
| 22 | 1 | 1 | 0 | $c$ | 4 | 1 |
| 23 | 1 | 0 | 0 | $d$ | 5 | 0 |

By combining the elements furnished by Tables II and III, and by designating by $\alpha$, $\beta$, $\gamma$ the 0 commands (corresponding to the YES indication) or 1 commands (corresponding to the NO indication) for all possible arrangements of the three twinned lines 25, 26 and 27, Table IV below is obtained:

TABLE IV

| FIG. | Command signals | | | Output signals to control surfaces | | | |
|---|---|---|---|---|---|---|---|
| | $\alpha$ | $\beta$ | $\gamma$ | 2 | 3 | 4 | 5 |
| FIG. 3 | 1 | 0 | 1 | 1 | 1 | 0 | 1 |
| FIG. 4 | 0 | 1 | 1 | 1 | 0 | 0 | 0 |
| FIG. 5 | 1 | 1 | 1 | 1 | 1 | 1 | 0 |
| FIG. 6 | 0 | 0 | 1 | 0 | 1 | 0 | 0 |
| FIG. 7 | 1 | 0 | 0 | 0 | 1 | 1 | 1 |
| FIG. 8 | 0 | 1 | 0 | 0 | 0 | 1 | 0 |
| FIG. 9 | 1 | 1 | 0 | 1 | 0 | 1 | 1 |
| FIG. 10 | 0 | 0 | 0 | 0 | 0 | 0 | 1 |

Using the Boolean notation, this control system by means of four signals $a$, $b$, $c$, $d$ applied to the control surfaces 2, 3, 4, 5 respectively, can be expressed by the formula:

$$\alpha \, ( \, \beta + \gamma \, ) + ( \, \bar{\beta}\bar{\gamma} \, )$$

where $\bar{\alpha} = 0$ if $\alpha = 1$ $$\alpha + \bar{\alpha} = 1$$

Using the Boolean notation, this control system by means of four signals $a$, $b$, $c$, $d$ applied to the control surfaces 2, 3, 4, 5 respectively, can be expressed by the formulae:

$a = \alpha \, ( \, \bar{\beta} + \gamma \, ) + \bar{\beta}\cdot\gamma$
$b = \alpha \, ( \, \bar{\beta} + \gamma \, ) + \bar{\beta}\cdot\gamma$
$c = \alpha \, ( \, \beta + \bar{\gamma} \, ) + \beta\cdot\bar{\gamma}$
$d = \alpha \, ( \, \bar{\beta} + \bar{\gamma} \, ) + \bar{\beta}\cdot\bar{\gamma}$ where the sign — designates complementarity, i.e.
$\beta = 1 \rightarrow \bar{\beta} = 0$, $\beta = 0 \rightarrow \bar{\beta} = 1$, $\gamma = 1 \rightarrow \bar{\gamma} = 0$ and $\gamma = 0 \rightarrow \bar{\gamma} = 1$,
the sign . designates multiplicaton and the sign + addition in the Boolean notation, i.e.
$\beta + \gamma = 0$ only if, at one and the same time, $\beta$ and $\gamma$ equal "0" and $\beta + \gamma =$ "1" in the other three cases.

It will be seen that in the case of FIGS. 10 and 11 (Table II), application of the formulae of Boolean algebra do in fact check out:

$a = \bar{\alpha} \, ( \, \bar{\beta} + \bar{\gamma} \, ) + (\bar{\beta}\bar{\gamma}) = 0$
$b = \bar{\alpha} \, ( \, \beta + \bar{\gamma} \, ) + ( \, \beta\bar{\gamma}) = 0$
$c = \bar{\alpha} \, ( \, \bar{\beta} + \gamma \, ) + ( \, \bar{\beta}\gamma) = 0$
$d = \bar{\alpha} \, ( \, \beta + \gamma \, ) + (\beta\gamma) = 1$ The following could also be checked out in the case of the other arrangements.

FIG. 3
$a = \alpha \, ( \, \bar{\beta} + \gamma \, ) + ( \, \bar{\beta} \, \gamma \, ) = 1$
$b = \alpha \, ( \, \beta + \gamma \, ) + ( \, \beta \, \gamma \, ) = 1$
$c = \alpha \, ( \, \bar{\beta} + \bar{\gamma} \, ) + ( \, \bar{\beta} \, \gamma \, ) = 0$
$d = \alpha \, ( \, \beta + \bar{\gamma} \, ) + ( \, \beta \, \bar{\gamma} \, ) = 1$ FIG. 4
$a = \bar{\alpha} \, ( \, \beta + \gamma \, ) + ( \, \beta \, \gamma \, ) = 1$ $b = \bar{\alpha}(\bar{\beta}+\gamma)+(\bar{\beta}\gamma)=0$
$c = \bar{\alpha}(\beta+\bar{\gamma})+(\beta\bar{\gamma})=0$
$d = \bar{\alpha}(\bar{\beta}+\bar{\gamma})+(\overline{\beta\gamma})=0$ FIG. 5 $a = \alpha(\bar{\beta}+\gamma)+(\bar{\beta}\gamma)=1$
$b = \alpha(\bar{\beta}+\gamma)+(\bar{\beta}\gamma)=1$
$c = \alpha(\beta+\bar{\gamma})+(\beta\bar{\gamma})=1$
$d = \alpha(\bar{\beta}+\bar{\gamma})+(\overline{\beta\gamma})=0$ FIG. 6
$a = \bar{\alpha}(\bar{\beta}+\gamma)+(\bar{\beta}\gamma)=0$
$b = \bar{\alpha}(\beta+\gamma)+(\beta\gamma)=1$
$c = \bar{\alpha}(\bar{\beta}+\bar{\gamma})+(\overline{\beta\gamma})=0$
$d = \bar{\alpha}(\beta+\bar{\gamma})+(\beta\bar{\gamma})=0$ FIG. 7
$a = \alpha(\bar{\beta}+\bar{\gamma})+(\overline{\beta\gamma})=0$
$b = \alpha(\beta+\bar{\gamma})+(\beta\bar{\gamma})=1$
$c = \alpha(\bar{\beta}+\gamma)+(\bar{\beta}\gamma)=1$
$d = \alpha(\beta+\gamma)+(\beta\gamma)=1$ FIG. 8
$a = \bar{\alpha}(\beta+\bar{\gamma})+(\beta\bar{\gamma})=0$
$b = \bar{\alpha}(\bar{\beta}+\bar{\gamma})+(\overline{\beta\gamma})=0$
$c = \bar{\alpha}(\beta+\gamma)+(\beta\gamma)=1$
$d = \bar{\alpha}(\bar{\beta}+\gamma)+(\bar{\beta}\gamma)=0$ FIG. 9
$a = \alpha(\beta+\bar{\gamma})+(\beta\bar{\gamma})=1$
$b = \alpha(\bar{\beta}+\bar{\gamma})+(\overline{\beta\gamma})=0$
$c = \alpha(\beta+\gamma)+(\beta\gamma)=1$
$d = \alpha(\bar{\beta}+\gamma)+(\bar{\beta}\gamma)=1$ Further, the values of the signals $a, b, c, d$ in the arrangements corresponding to the different figures in the drawings may be expressed by means of Table V below, in which $\alpha$ is a roll command signal:

TABLE V

|  | $\beta\gamma$ | $\bar{\beta}\gamma$ | $\beta\bar{\gamma}$ | $\overline{\beta\gamma}$ |
|---|---|---|---|---|
| $\alpha$: | | | | |
| FIG. 3 | b | a | d | c |
| FIG. 5 | a | b | c | d |
| FIG. 7 | d | c | b | a |
| FIG. 9 | c | d | a | b |
| $\bar{\alpha}$: | | | | |
| FIG. 4 | a | b | c | d |
| FIG. 6 | b | a | d | c |
| FIG. 8 | c | d | a | b |
| FIG. 10 | d | c | b | a |

Table V above shows that the determinants $|a, b, c, d|$ corresponding to each value of $\alpha$ are symmetrically arranged around the diagonals, with the signals $b, c, a, d$ respectively constituting the four diagonals.

It may also be noted that the signal:

$$a = \alpha(\bar{\beta}+\gamma)+\bar{\beta}\gamma$$

takes the form

AND + OR ($\alpha = [\alpha$ AND ($\beta$ OR $\gamma$] OR [$\beta$ AND $\gamma$])

for if $\bar{\beta}+\bar{\gamma}=0$   then $a=0$ and if $\overline{\beta \text{ or } \gamma}=0$   then $a=\alpha$ It is accordingly possible to obtain an electronic computer by suitably combining OR and AND gates, or preferably a modular electronic computer by combining in series and in parallel a plurality of gates uniquely of the NOR type. In both cases the gates would be so controlled as to provide in accordance with this invention control over eight combinations out of the 16 possible quadruplets for four 2-position control surfaces, and this by means of the eight triplets of three binary command signals $\alpha$, $\beta$ and $\gamma$.

The 20 switches of the example in FIG. 11 can then be replaced with advantage by a combination of 14 NOR type gates, for instance gates biassed in such manner that the output be blocked if one input is energized (or, conversely, the output energized if the two gates are blocked).

Figure 12:
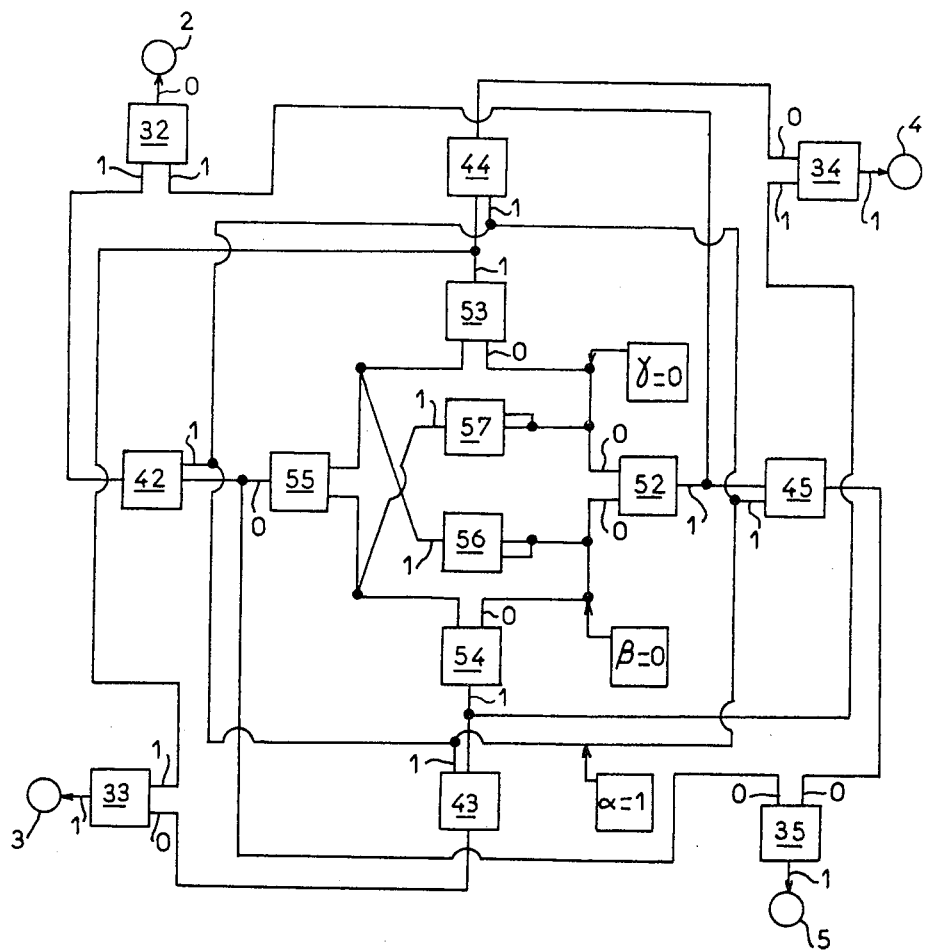
FIG. 12 is a corresponding electronic circuit diagram.

It will be noted that the exemplary circuit diagram in FIG. 12, on which the appropriate signals are indicated on all the lines for the following combination of input signals:

$$\alpha(\bar{\beta}+\bar{\gamma})+(\overline{\beta\gamma}),$$

produces outputs at 2, 3, 4, 5 corresponding to the control surface configuration of FIG. 7.

It will suffice to that end to apply to the four output gates 32, 33, 34 and 35 the signals from four intermediate gates 42, 43, 44 and 45, the other input signal being the output signal of one of the four corresponding primary gates 52, 53, 54 and 55, and each of said intermediate gates receiving on one input the signal $\alpha$ and on the other input the opposed output signals from primary gates 55, 54, 53 and 52 respectively.

The input signals from one of the two opposed primary gates 52 or 55 are the signals $\beta$, $\gamma$, and the input signals from the other opposed primary gate 55 (or 52) are the opposed signals $\bar{\beta}$, $\bar{\gamma}$ delivered by the inversely biassed gates 56 and 57, and the input signals from the two offset gates 53 and 54 are reversed as $\bar{\beta}\gamma$ and $\beta\bar{\gamma}$ respectively.

Figure 13:
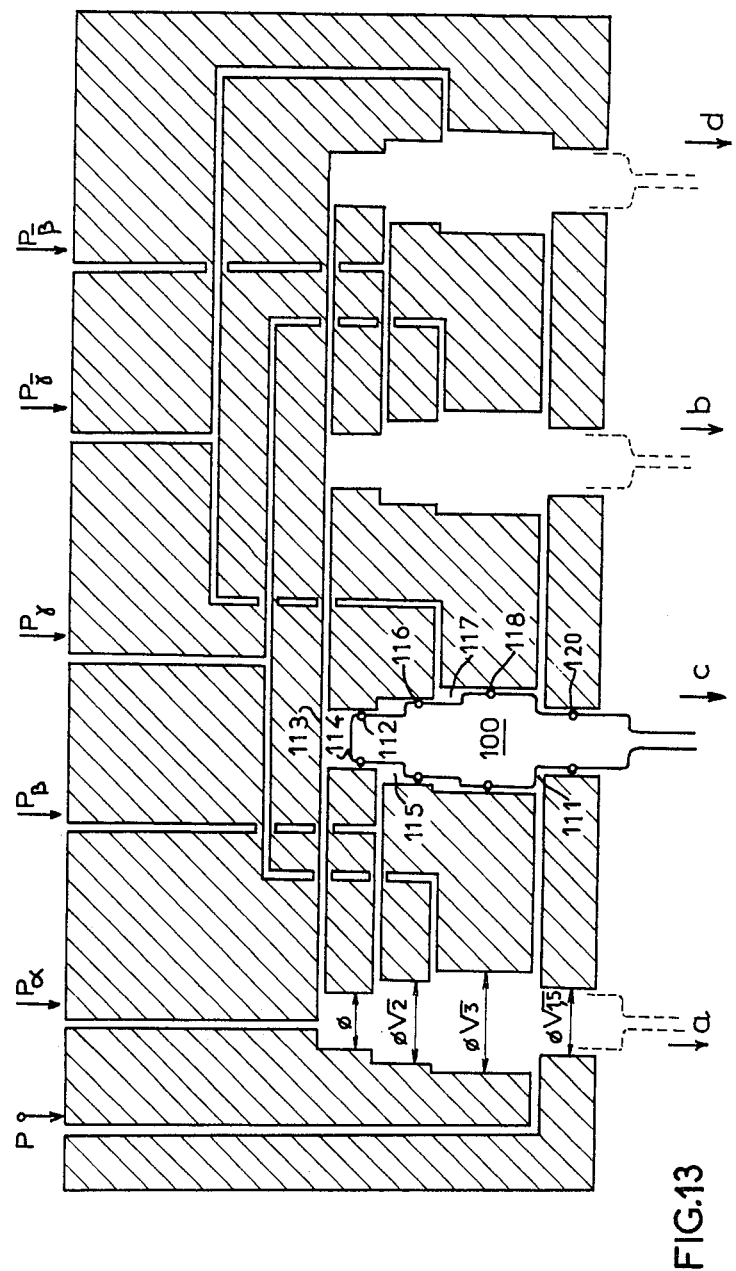
FIG. 13 is a corresponding pneumatic or hydraulic circuit diagram.

A third possible embodiment utilizing a pneumatic or hydraulic circuit is shown in FIG. 13.

It includes four stepped slide-valves 100, each supporting four sliding seals 112, 116, 118 and 120 the successive diameters of the sliding portions of which — taking as reference diameter that of the sliding element of upper seal 112 — are respectively in the ratios of $\sqrt{2}$, $\sqrt{3}$ and $\sqrt{1.5}$ (in the case of the lowermost seal).

The four slide-valves 100 have the cavities bounded between upper wall 113 of the stationary portion, upper portion 114 of the movable portion and upper face of the upper seal 112, either vented when the value of the binary input signal is 0 or supplied by a source of relative pressure P when the corresponding command signal $\alpha$ is a 1. Already known are systems, such as those utilizing ball-valves, capable of causing a given conduit to be either vented or connected to the pressure source, depending on the value of a binary input.

The input or output binary limit position of each slide-valve determines a specific one of the binary signals $a, b, c$ and $d$ controlling the four control surfaces, for instance by directly interconnecting the slide-valves with the levers actuating the mechanical control means of the control surfaces.

The cavities 115 situated immediately below the cavity in which prevails the pressure determined by binary signal $\alpha$, namely those bounded by the lower face of the upper seal 112 of reference diameter and by the upper face of the seal 116 the diameter of which is in the ratio of $\sqrt{2}$ to that of the seal 112, are either supplied by the pressure source P or vented, depending on the value of the binary control signal $\beta$, as follows: the corresponding cavities 115 of the slide-valves 100 the position of which determines the binary outputs $a$ and $c$ are supplied when $\beta = 1$ and vented when $\beta = 0$, while the corresponding cavities of the slide-valves the position of which determines the binary outputs $b$ and $d$ are supplied when $\beta = 0$ and vented when $\beta = 1$, and this through the agency of means well-known per se, such as the aforesaid ball-valves.

The cavities 117 located immediately below the preceding cavities 115 in which prevails the pressure determined by binary signal $\beta$, namely the cavities bounded by the lower face of seal 116 the diameter of the sliding portion of which is in the ratio of $\sqrt{2}$ to that of the upper reference seal 112, and by the upper face of the seal 118 the ratio of the sliding portion of which is in the ratio of $\sqrt{3}$ to that of seal 112, are supplied as follows depending on whether the binary input variable $\gamma$ bears the value 0 or 1: the corresponding cavities of the slide-valves the positions of which determine the binary outputs $a$ and $b$ are supplied by the pressure source if $\gamma = 1$ and vented if $\gamma = 0$; conversely, the corresponding cavities in the slide-valves the positions of which determine the binary outputs $c$ and $d$ are vented if $\gamma = 0$ and supplied if $\gamma = 1$.

Lastly, the lowermost cavities 111 of the four slide-valves 100, i.e. the cavities bounded between the seals 118 and 120 the sliding diameters of which are in the ratios of $\sqrt{3}$ and $\sqrt{1.5}$ to the reference diameter, remain constantly supplied by the pressure source, whereas the lowermost end of each slide-valve is constantly vented.

The resultant force applied to each of the four slide-valves takes the form $$[P(3-1.5) - P_\alpha - P_\beta \text{ (or } P_{\bar\beta}) - P_\gamma \text{ (or } P_{\bar\gamma})]k$$

where $P_\alpha$, $P_\beta$ and $P_\alpha$ are equal respectively to $P$ if $\alpha, \beta$ or $\gamma = 1$ and equal to zero if $\alpha, \beta$ or $\gamma = 0$; similarly $P_{\bar\beta} = P$ if $\bar\beta = 1$, $P_{\bar\beta} = 0$ if $\bar\beta = 0$, $P_{\bar\gamma} = P$ if $\bar\gamma = 1$, and $P_{\bar\gamma} = 0$ if $\bar\gamma = 0$.

Designating by $F_a$, $F_b$, $F_c$ and $F_d$ the resultant forces on the slide-valves the input or output positions of which determine the value 0 or 1 for the binary variables $a, b, c$ or $d$, we therefore have:

$F_a = (P_\alpha + P_\beta + P_\gamma - 1.5 \times P)\,k$
$F_b = (P_\alpha + P_{\bar\beta} + P_\gamma - 1.5 \times P)\,k$
$F_c = (P_\alpha + P_\beta + P_{\bar\gamma} - 1.5 \times P)\,k$
$F_d = (P_\alpha + P_{\bar\beta} + P_{\bar\gamma} - 1.5 \times P)\,k$ whence the following tabulation:

TABLE VI

| Command signals: | | | Output signals: | | | |
|---|---|---|---|---|---|---|
| $\alpha$ | $\beta$ | $\gamma$ | $Fa/k$ | $Fb/k$ | $Fc/k$ | $Fd/k$ |
| 0 | 0 | 0 | −1.5 | −0.5 | −0.5 | 0.5 |
| 0 | 0 | 1 | −0.5 | −1.5 | 0.5 | −0.5 |
| 0 | 1 | 0 | −0.5 | 0.5 | −1.5 | −0.5 |
| 0 | 1 | 1 | 0.5 | −1.5 | −0.5 | −1.5 |
| 1 | 0 | 0 | −0.5 | 0.5 | 0.5 | 1.5 |
| 1 | 0 | 1 | 0.5 | −0.5 | 1.5 | 0.5 |
| 1 | 1 | 0 | 0.5 | 1.5 | −0.5 | 0.5 |
| 1 | 1 | 1 | 1.5 | 0.5 | 0.5 | −0.5 |

This gives the signs $sP_a$, $sP_b$, $sP_c$ and $sP_d$ of the forces $P_a$, $P_b$, $P_c$ and $P_d$, which are related to the three input variables as shown in Table VII below:

TABLE VII

| Command Signals: | | | Output signals: | | | |
|---|---|---|---|---|---|---|
| $\alpha$ | $\beta$ | $\gamma$ | $sP_a$ | $sP_b$ | $sP_c$ | $sP_d$ |
| 0 | 0 | 0 | − | − | − | + |
| 0 | 0 | 1 | − | − | + | − |
| 0 | 1 | 0 | − | + | − | − |
| 0 | 1 | 1 | + | − | − | − |
| 1 | 0 | 0 | − | + | + | + |
| 1 | 0 | 1 | + | − | + | + |
| 1 | 1 | 0 | + | + | − | + |
| 1 | 1 | 1 | + | + | + | − | which, if the binary variables 0 and 1 are made to correspond to the − and + signs respectively, gives the following tabulation:

TABLE VIII

| Command signals: | | | Output signals: | | | | Corresponding |
|---|---|---|---|---|---|---|---|
| $\alpha$ | $\beta$ | $\gamma$ | $a$ | $b$ | $c$ | $d$ | to FIG. |
| 0 | 0 | 0 | 0 | 0 | 0 | 1 | FIG. 10 |
| 0 | 0 | 1 | 0 | 0 | 1 | 0 | FIG. 8 |
| 0 | 1 | 0 | 0 | 1 | 0 | 0 | FIG. 6 |
| 0 | 1 | 1 | 1 | 0 | 0 | 0 | FIG. 4 |
| 1 | 0 | 0 | 0 | 1 | 1 | 1 | FIG. 7 |
| 1 | 0 | 1 | 1 | 0 | 1 | 1 | FIG. 9 |
| 1 | 1 | 0 | 1 | 1 | 0 | 1 | FIG. 3 |
| 1 | 1 | 1 | 1 | 1 | 1 | 0 | FIG. 5 |

The slide-valve accordingly reaches its position of limit upward or downward travel depending on the sign of the resultant force applied to it, and furthermore a table of correspondence (Table VIII) similar to Table IV is available.

It goes without saying that other types of pneumatic or hydraulic circuits may be deduced by equivalence with the elecric or electronic circuits described precedingly.

An advantageous embodiment of the invention consists in generating the binary input signal $\alpha$ from observation of the angular errors of the missile in roll (i.e. about its longitudinal axis), and the other two commands $\beta$ and $\gamma$ from observation of the angular deviations or lateral shifts of the missile in the region of the two planes which bisect the angles between the two principal planes and each of which contains two diametrically opposed control surfaces and the longitudinal axis of the missile.

Indeed the simultaneous effect of two such commands, assumed to be of the same amplitude level but of controllable sign, each in one of the bisecting planes, invariably leads to a resultant force or effect contained in a principal plane. This effect is produced by the two control surfaces of the proposed system that produce a pitching or yawing motion, the other two control surfaces serving to control the missile in roll without having any residual pitch-yaw motion.

It is known to employ angular motion detecting systems utilizing a binary output, which are either internal to the missile and utilize rate gyros, gyroscopes and accelerometers, or which are based on an external observation of the motions of the missile laterally or about its centre of gravity, by means for example of infrared direction-finders delivering directional error signals that may include collector networks in conjunction with a scanning wave and the indications from which, upon being compared with a reference level (in an electronic flip-flop for instance), can be used to deliver binary command signals such as $\alpha$, $\beta$ and $\gamma$ according to the sign of the result of such comparison.

It is customary to dispose a first such system responsive to roll motion of the missile for the purpose of generating the binary command $\alpha$, a second responsive to angular or lateral motion with respect to one of the two bisecting planes lying between the two principal planes and each containing two diametrically opposed control surfaces and the longitudinal axis of the missile, whereby to generate the binary input signal $\beta$, and a third system sensitive to angular or lateral motion in the other bisecting plane and serving to generate the binary input signal $\gamma$.

By consulting in particular Tables IV and VIII with reference to FIGS. 3 to 10, it is possible to verify that the sense of the resultant rolling moment produced by the combined deflections of the four control surfaces is, in a sense, related biunivocally to the value of the binary variable $\alpha$ (FIGS. 3, 5, 7, 9: $\alpha = 1$ with a counter-clockwise rolling moment; FIGS. 4, 6, 8, 10: $\alpha = 0$ with a clockwise rolling moment).

As a rule, the amplitude levels in the case of the four control-surface forces will be equal in absolute value but of opposite sign in the case of the two signals corresponding to the same control surface. For certain applications, however, it may be necessary to use non-symmetrical levels in order to compensate for example for a known mean perturbing moment by utilizing a beat effect whereby the control surfaces dwell in each of the two positions for a substantially equal time.

Similarly, selection of the centre of gravity as the reference centre relates to controlling the flight of a free body in space, but the invention may be applied in similar manner to a solid pivoting about its three angular degrees of freedom about an articulation or pivot which would then perform the function of the centre of gravity G.

Figure 16:
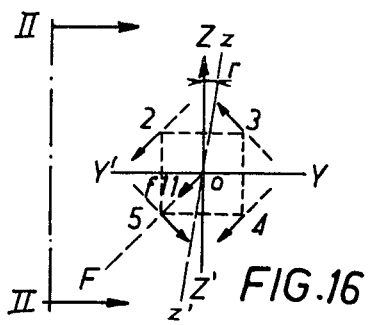
FIGS. 16 to 19 are schematic frontal views, along III-III of FIG. 14, of the positions of the jet spoilers for generating a roll command in the counter-clockwise sense.

A second embodiment illustrated in FIG. 16 shows how the control surfaces 2, 3, 4 and 5 of a missile 101 according to this invention are positioned in normal steady flight on the bisectors of the axes Z'Z and Y'Y over a cross-section of the missile passing through 0 rearwardly of the missile's centre of gravity G, each thruster jet being directed perpendicularly to the corresponding bisector.

Figure 14:
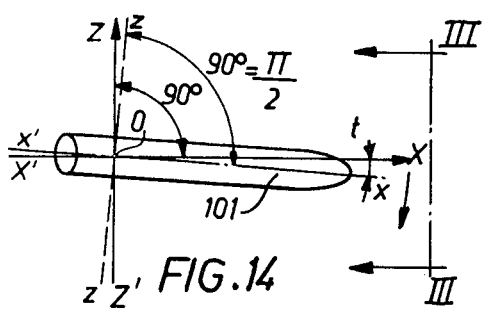
FIG. 14 is a side elevation view of a missile in a second form of embodiment of the invention, showing the diving configuration.
Figure 15:
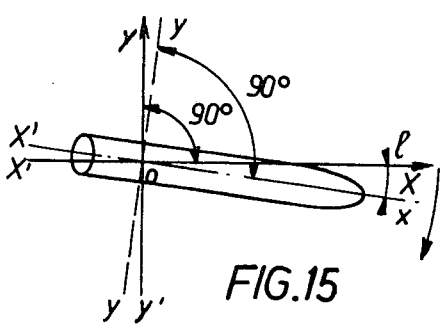
FIG. 15 is a plan view of the missile in FIG. 14, shown veering to the right.

As in the previously described embodiment, the control surfaces are so controlled that, in the case of FIG. 16, control surfaces 3 and 5 jointly produce a rotation about the axis XX' and control surfaces 2 and 4 a pivoting effect in the direction of arrow f11, i.e. a pivoting motion tending at once to lift the nose of the missile and to cause it to yaw to the left, in order to correct an undesirable attitude shown in FIGS. 14 and 15.

For the situation illustrated in three principal planes in FIGS. 14 to 16, it will be seen that in order to correct the attitude of the missile (shown with its longitudinal axis $x'x$ in dot-dash lines) with respect to the vertical and horizontal planes XOZ and XOY, it is necessary and sufficient for the thrusters acting on the four control surfaces 2 to 5 to be configured responsively to the following binary error signals (taken, in accordance with convention, as 1 in the counter-clockwise sense and as 0 in the clockwise sense):

in pitch $t = 0$ (FIG. 14)
in yaw $l = 0$ (FIG. 15)

It will be seen also that, in the case of FIGS. 16 to 19, the configuration of the jets corresponds to a binary roll error signal $r = 0$ and, in the case of FIGS. 20 to 23, to a binary roll error signal $r = 1$.

It is also to be noted that in the configuration of FIGS. 17 to 21, the force $f12$ producing a leftward diving moment corresponds to the "rightward nose-up attitude" signals delivered by, say, gyroscopic sensors or accelerometer sensors:

in pitch $t = 1$
in yaw $l = 0$

Figure 18:
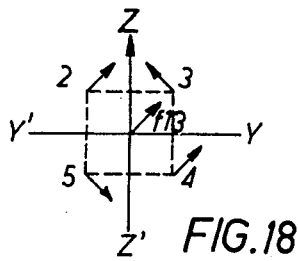
Figure 22:
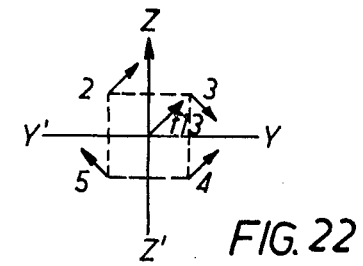

Similarly, the force f13 in FIGS. 18 and 22 would correspond to the signals:

in pitch $t = 1$
in yaw $l = 1$

Figure 19:
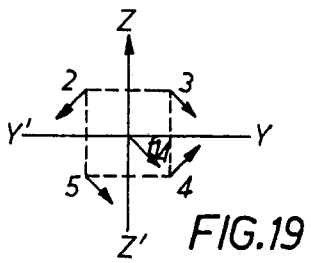
Figure 23:
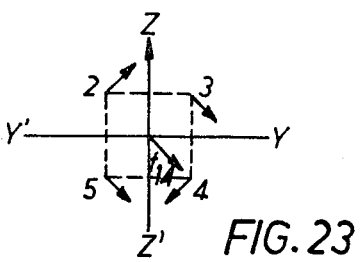

Lastly, the force $f14$ in FIGS. 19 and 23 would correspond to the signals:

in pitch $t = 0$
in yaw $l = 1$

It is thus possible in accordance with the invention to automatically and continuously correct the attitude of the missile by means of the four jet control surfaces 2 to 5 by continuously energizing them in one sense (such as the one shown in solid lines for the four control surfaces on FIG. 16) or in the opposite sense shown in dash lines.

Indeed, in roll, any rotating effect about the missile axis $xx'$, away from XX' (the commanded flight path), must be such as to trigger off, on the level of the roll sensor connected to a gyroscope or an accelerometer (not shown), a corrective response that fetches the reference axis $zz'$ of the missile onto the spatial reference axis ZZ'.

Similarly, in pitch, any unwanted rotation about the missile axis $yy'$ ultimately produces a response from the pitch sensor, while in yaw any unwanted rotation of the missile about its vertical axis $zz'$ will ultimately produce a response from the directional error sensor.

Thus if the control surfaces are arranged as shown in the figures, the missile is at all times subjected to a corrective force $f11, f12, f13$ or $f14$ which corrects its attitude error in both pitch and yaw.

To obtain a correct missile trajectory by means of pulses that hold the missile to a path which is a helix finely wound around the imposed trajectory, it will suffice to refer once more to the data in Table IV for example, making the forces $f11$ to $f14$ correspond in each case to the appropriate attitude correcting force acting responsively to the roll, pitch and yaw signals ($r$, $t$ and $l$, hereinafter designated as $\alpha$, $\beta$, and $\gamma$ in order to retain the same symbols).

Such correspondence is given in Table IX below:

TABLE IX

Figure 20:
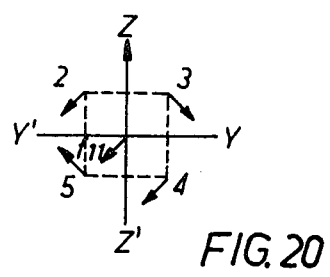
FIGS. 20 to 23 are corresponding views for clockwise roll commands.
Figure 17:
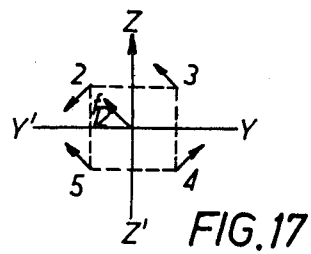
Figure 21:
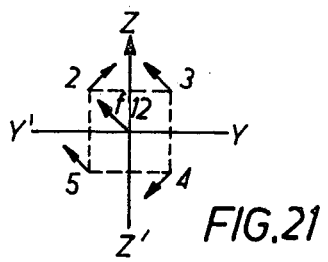

| FIGS. | Command signals: | | | Output signals to control surfaces: | | | |
|---|---|---|---|---|---|---|---|
| | $\alpha$ | $\beta$ | $\gamma$ | 2 | 3 | 4 | 5 |
| FIG. 16 | 1 | 0 | 0 | 1 | 1 | 0 | 1 |
| FIG. 20 | 0 | 0 | 0 | 1 | 0 | 0 | 0 |
| FIG. 21 | 0 | 1 | 0 | 0 | 1 | 0 | 0 |
| FIG. 18 | 1 | 1 | 1 | 0 | 1 | 1 | 1 |
| FIG. 22 | 0 | 1 | 1 | 0 | 0 | 1 | 0 |
| FIG. 19 | 1 | 0 | 1 | 1 | 0 | 1 | 1 |
| FIG. 23 | 0 | 0 | 1 | 0 | 0 | 0 | 1 |

Figure 24:
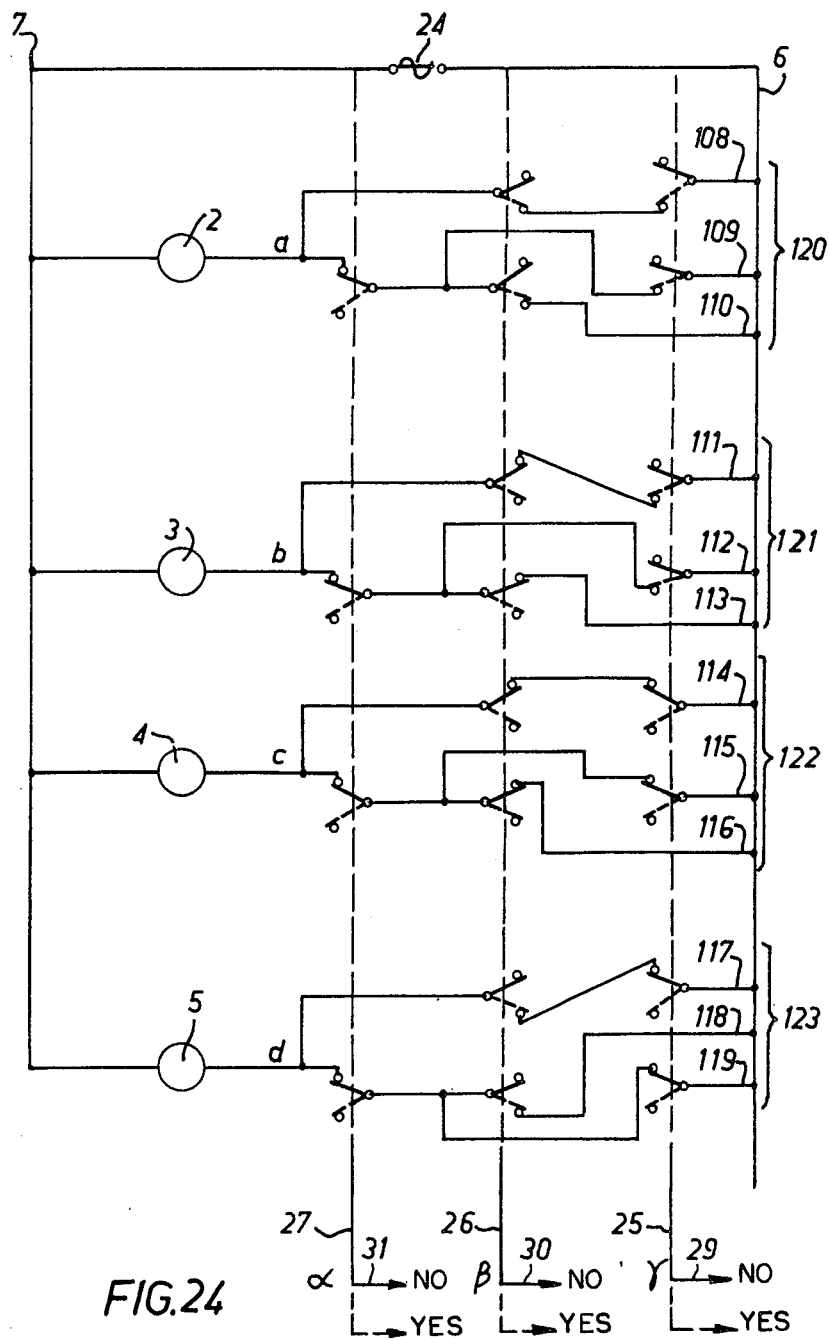
FIG. 24 shows an electric control circuit in accordance with the second form of embodiment of the invention.

Using the Boolean notation, this control system by four signals $a$, $b$, $c$ and $d$ applied to control surfaces 2, 3, 4, 5 respectively, can be expressed by the formula:

$$\alpha(\beta + \gamma) + (\bar{\beta}\bar{\gamma})$$

where $\bar{\alpha} = 0$ if $\alpha = 1$ and $\alpha + \beta = 1$ whenever $\alpha = 1$ and/or $\beta = 1$ FIG. 24 provides a possible embodiment of the simplest electrical circuit diagram corresponding to the control surface configuration shown in FIG. 18.

A current source 24 across lines 6 and 7 energizes the GO - NO GO type flip-flops of control surfaces 2, 3, 4, 5 via the twelve circuits 108 to 119 arranged in four groups 120 to 123 (FIG. 24).

FIG. 24 shows three lines 25, 26 and 27 of twinned switches arranged on the circuits 108 to 119 in a manner to be described in detail hereinbelow.

Depending on whether the pointers 29, 30 and 31 lie opposite the indication YES or the indication NO, a certain signal of the form ($\alpha, \beta, \gamma$) is applied to the four groups of electric circuits 120 to 123.

When the three pointers lie opposite the NO indications in FIG. 24, the arrangements tabulated below in Table X are obtained for the $\alpha', \beta', \gamma'$ excitations in the different groups 120 to 123 which correspond to the thruster configuration shown in FIG. 18.

TABLE X

| Group | Command signals $\alpha'$ $\beta'$ $\gamma'$ | Output line | Control surface | Output signal |
|---|---|---|---|---|
| 120 | 1 0 0 | a | 2 | 0 |
| 121 | 1 1 0 | b | 3 | 1 |
| 122 | 1 1 1 | c | 4 | 1 |
| 123 | 1 0 1 | d | 5 | 1 |

Conversely, when pointers 29 to 31 are in the position shown in dash lines opposite the YES indication, all the switches are reversed and the opposite arrangement of Table XI below, corresponding to the thruster configuration of FIG. 20, is obtained.

TABLE XI

| Group | Command signals $\alpha'$ $\beta'$ $\gamma'$ | Output line | Control surface | Output signal |
|---|---|---|---|---|
| 120 | 0 1 1 | a | 2 | 1 |
| 121 | 0 0 1 | b | 3 | 0 |
| 122 | 0 0 0 | c | 4 | 0 |
| 123 | 0 1 0 | d | 5 | 0 |

It may be verified likewise that the correspondence in Table IX is valid for the other arrangements.

The desired result can also be obtained by suitably combining OR gates with AND gates, or by using the NOR gates of an electronic computer similar to that of FIG. 12, or by means of the pneumatic or hydraulic circuit of FIG. 13.

It likewise goes without saying that changes and substitutions may be made in the preferred exemplary embodiment described hereinbefore, without departing from the scope of the invention as set forth in the appended claims.

We claim:

1. A logic flight control system for a missile comprising at least four jets each with an identical jet control surface actuated by a GO NO GO output signal, said control surfaces combined so as to simultaneously generate a moment in one or the other direction about the missile symmetry axis and one or both of two gyrating moments in two principal planes of the missile, said four jets control surfaces evenly spaced on a plane normal to the missile symmetry axis with said plane passing through the missile symmetry axis at a point spaced from the center of gravity of the missile, said four control surfaces being controlled by a combination of three binary command input signals, each of said control surfaces being actuated by a binary output signal which locks in one of two positions at an angle to the radial plane of the missile; and a jet deflector which continuously imparts a gyrating moment to the missile in one direction or the other, the combination of said four jets allowing the imparting to the missle a rolling and yawing or pitching motion by means of three binary signals.

2. A system according to claim 1, characterized in that the four output signals to the four control surfaces are combined to produce a moment and a resultant force where four binary signals of position $a,b,c$, and $d$ are respectively emitted on each of said four jet control surfaces with said signals controlled by the combination of three binary command input signals $\alpha, \beta$, and $\gamma$, the effect of the moment being to restore a missile reference plane into a fixed plane in space and that of the resultant force being to impart a yawing or pitching motion to the missile.

3. A system according to claim 2, characterized in that eight combinations of the four output signals corresponding to the combining of a nose-down, nose-up, rightward and leftward motion with a rolling motion in one or the other direction, are commanded as required by one of eight triplet arrangements of the three binary input signals.

4. A system according to claim 3, characterized in that provision is made for independently and simultaneously generating the command for the sign of each of the three components of the resultant moment applied to the missile by the four control surfaces, respectively about three mutually perpendicular axes passing through the centre of gravity, of which one is adjacent the longitudinal axis of the missile and the other two inclined at approximately 45° to the directions parallel to the two diagonals of the square substantially at the corners of which are the points of application of the control surface forces, each of said forces acting in a direction substantially parallel to the diagonal on which the corner through which that force is applied does not lie.

5. A system according to claim 4, characterized in that one of said binary input signals corresponds to the commanding of an angular motion of the missile about its longitudinal roll axis, and the other two binary input signals to producing a combined yawing/pitching motion with respect to one of the two planes bisecting the two principal planes, that is to say along which occur the gyrating effects due to the combined deflections of two diametrically opposed control surfaces lying in those planes and which further contain the longitudinal axis of the missile.

6. A system according to claim 2, characterized in that it includes four groups of electric circuits on the four output lines respectively, three lines for controlling twinned switches on said circuits being controlled, in either of two YES or NO positions, by the three input signals whereby to deliver on each output line a signal in the form of $\alpha(\beta+\gamma) + (\beta\gamma)$ in the classic Boolean notation where $\bar{\alpha}, \bar{\beta}$, and $\bar{\gamma}$ mean the opposite binary signals of $\alpha, \beta$, and $\gamma$ respectively.

7. A system according to claim 6, characterized in that each of said groups of circuits includes one of the lines $\beta\gamma$, $\bar{\beta}\gamma$, $\beta\bar{\gamma}$, and $\bar{\beta}\bar{\gamma}$ to the exclusion of the others.

8. A system according to claim 7, characterized in that said any line is parallel-connected with two lines in parallel $(\alpha\beta, \alpha\gamma)$, $(\alpha\bar{\beta}, \alpha\gamma)$, $(\alpha\beta, \alpha\bar{\gamma})$ or $(\alpha\bar{\beta}, \alpha\bar{\gamma})$.

9. A system according to claim 2, characterized in that the three input signals control the four output signals by means of a modular electronic circuit based on a single NOR gate whereby to furnish a combination of signals of the form $\alpha(\beta+\gamma) + (\beta\gamma)$.

10. A system according to claim 8, including four output gates, four intermediate gates, four primary gates and two reversing gates, the signal $\alpha$ being applied to one input of each of the four intermediate gates, the symetrical signals $\beta$ and $\gamma$ being applied together to a first primary gate and each to a reversing gate, second and third primary gates receiving the $\bar{\beta}\gamma$ and $\beta\bar{\gamma}$ signals respectively and the fourth primary gate receiving the inputs $\bar{\beta}$, $\bar{\gamma}$ formed by the two reversing gates, each intermediate gate receiving the output signal from an associated primary gate and delivering its output to an associated output gate, each output gate receiving as its second input signal the signal from a primary gate lying in opposition to the associated intermediate gate.

11. A system according to claim 2, characterized in that it includes a computer of the function $a = \alpha (\beta+\gamma) + (\beta\gamma)$, each of the four outputs occurring to determine combinations $a, b, c, d$ as a function of $\alpha$ and $\beta\gamma$ on a diagonal of the square table.

12. A system according to claim 6, characterized in that the three input signals control the four output signals or the movable members of the four control surfaces directly by means of a pneumatic circuit comprising four stepped slide-valves having four seals the successive diameters of which are in the ratios of $1$, $\sqrt{2}$, $\sqrt{3}$ and $\sqrt{1.5}$ respectively, the feed pressure being invariably supplied between the two seals the diameters of which are in the ratio of $\sqrt{1.5}$ and $\sqrt{3}$ to the reference diameter, the other face of the seal the diameter of which is in the ratio of $\sqrt{1.5}$ being always vented together with that portion of the slide-valve bounded by it, the seal the sliding diameter of which is in the ratio of $\sqrt{3}$ and the seal the diameter of which is in the ratio $\sqrt{2}$ being determined as being either at the feed pressure or vented according as the value of the binary command is $\gamma$ or its complement $\bar{\gamma}$, depending on the slide-valve being considered, the pressure between the seals having sliding diameters in the ratios $\sqrt{2}$ and $1$ to the reference diameter being determined likewise according as the value of the binary input is $\beta$ or its complement $\bar{\beta}$, depending on the slide-valve being considered, the values $\beta$ or $\bar{\beta}$ and $\gamma$ or $\bar{\gamma}$ being so chosen as to produce upon the several four slide-valves a particular one of the four moments $\beta\gamma$, $\bar{\beta}\gamma$, $\beta\bar{\gamma}$ and $\bar{\beta}\bar{\gamma}$, and lastly the other face of the seal having a sliding diameter in the ratio of unity with respect to the reference diameter being, in the case of each of the four slide-valves, either subjected to pressure or vented dependently only on the binary input value $\alpha$.

13. A flight control system according to claim 1 further characterized by said control surfaces lying on planes bisecting the angles between the principal planes in space passing through the flight vector of the missile and of said jets being directed at right angles to the associated bisecting plane.

14. A system according to claim 13, characterized in that the binary input signal $\alpha$ corresponds to a command for an angular motion of the missile about its longitudinal roll axis, and the two other binary input signals $\beta$ and $\gamma$ to commanding a combined yawing and pitching motion substantially in one of the two planes bisecting said two principal planes where four binary signals of position $a, b, c,$ and $d$ are respectively emitted on each of said four jet control surfaces with said signals controlled by the combination of three binary command input signals $\alpha$, $\beta$, and $\gamma$.

15. An system for a flight control system according to claim 14, characterized in that it includes four groups of electric circuits on the four output lines respectively, each of which corresponds to a jet control surface, three control lines of twinned switches on said circuits being activated into two YES or NO positions by the input signals $\alpha, \beta, \gamma$, whereby to deliver on each output line a signal of the form $\alpha(\beta+\gamma) + (\beta\gamma)$ in the classic Boolean notation that automatically and continuously corrects the missile attitude.

16. A system according to claim 14, characterized in that the three input signals activate the four output signals by means of a modular electronic circuit based on a single NOR gate whereby to deliver a combination of signals of the form $\alpha(\beta+\gamma) + (\beta\gamma)$.

17. A system according to claim 1, characterized in that the three input signals activate the four output signals by means of a pneumatic circuit having stepped slide-valves.

* * * * *